United States Patent [19]

Wasko

[11] Patent Number: 4,805,295

[45] Date of Patent: Feb. 21, 1989

[54] METHOD FOR WINDING ARMATURE FOR ROTARY CONVERTER

[76] Inventor: George J. Wasko, Highway 86 South, Lakefield, Minn. 56150

[21] Appl. No.: 93,646

[22] Filed: Sep. 8, 1987

Related U.S. Application Data

[62] Division of Ser. No. 843,031, Mar. 24, 1986, Pat. No. 4,707,629.

[51] Int. Cl.$^4$ ............................................. H02K 15/09
[52] U.S. Cl. ...................................... 29/598; 310/129
[58] Field of Search ................... 29/597, 598; 310/129, 310/128, 205–208

[56] References Cited

U.S. PATENT DOCUMENTS

| | | | |
|---|---|---|---|
| 673,807 | 5/1901 | Watson | 363/103 |
| 732,906 | 7/1903 | Steinmetz | 363/103 |
| 1,244,569 | 10/1917 | Woodbridge | 363/105 |
| 1,284,370 | 11/1918 | La Cour | 363/103 |
| 1,862,543 | 6/1932 | McDowell | 310/129 |
| 1,964,922 | 7/1934 | Martin | 310/129 |
| 2,462,624 | 2/1949 | Fletcher | 363/103 |
| 2,502,964 | 4/1950 | Klima | 171/206 |
| 2,525,913 | 10/1950 | Klima | 171/252 |
| 2,796,580 | 6/1957 | Maggs | 322/49 |
| 2,831,154 | 4/1958 | Dudenhausen | 318/231 |
| 3,665,502 | 5/1972 | Means | 321/28 |
| 3,913,004 | 10/1975 | Alexander | 321/28 |
| 4,024,455 | 5/1977 | Yarrow et al. | 321/29 |
| 4,117,390 | 9/1978 | Iwata et al. | 322/90 |
| 4,274,046 | 6/1981 | Harrison | 323/355 |

FOREIGN PATENT DOCUMENTS 1120611 7/1956 France.

OTHER PUBLICATIONS

Catalog Sheet No. RC-182, Kato Engineering Company, Mankato, Minnesota, Division of Reliance Electric Co.
Puchstein, A., T. Lloyd and A. Conrad, *Alternating Current Machines*, Chapter 44 (3rd ed., 1954), published by John Wiley & Sons, Inc. New York.

*Primary Examiner*—Carl E. Hall
*Attorney, Agent, or Firm*—Kinney & Lange

[57] ABSTRACT

A method of winding an armature for a rotary converter for converting direct current to alternating current. The rotary converter includes a rotor and a stator. The rotor includes a shaft, a commutator concentric with the shaft, and an armature core concentric with the shaft and adjacent the commutator, the core having slots in its outer circumference parallel to the axis of the shaft. At least one slip ring is mounted on the shaft adjacent the armature core. A first or direct current winding is electrically connected to the commutator and wound in a wave pattern through the armature core slots. A second or alternating current winding is electrically connected to at least one slip ring and wound in a series of alternating clockwise and counterclockwise loops throuth the armature core slots. The rotary converter is particularly suitable for operation from a standard twelve volt battery to supply alternating current at a desired rating to electric tools and the like.

3 Claims, 3 Drawing Sheets

METHOD FOR WINDING ARMATURE FOR ROTARY CONVERTER

This is a division of application Ser. No. 06/843,031, filed Mar. 24, 1986, now U.S. Pat. No. 4,707,629.

BACKGROUND OF THE INVENTION

1. Field of the Invention

The present invention relates generally to a rotary converter for converting direct current to alternating current and, more particularly, is concerned with the current windings of the rotor of such a converter.

2. Description of the Prior Art

Generally, a dynamo is a rotating electric machine capable of converting electric energy into mechanical energy (a motor) or converting mechanical energy into electric energy (a generator). A dynamo consists of a rotor (that part of a dynamo which rotates) and a stator (that part of a dynamo which is stationary). Various dynamo designs and configurations are known for operating from or producing direct current and alternating current.

A rotary converter is a dynamo capable of operating from direct current and supplying alternating current, or vice versa. The rotor includes a shaft, an armature core, a commutator and slip rings. A single armature winding is wound around slots in the armature core and electrically connected to the commutator and the slip rings. The commutator acts as a rectifying device so that the current or voltage in the external circuit is unidirectional. When power is supplied to the converter, the rotor rotates in its magnetic field in known manner for dynamos. A discussion of characteristics of converters is presented in Chapter 44 of A. Puchstein, T. Lloyd and A. Conrad, *Alternating-Current Machines* (3rd ed. 1954), published by John Wiley & Sons, Inc. of New York.

U.S. Pat. No. 673,807 to Watson, issued in May of 1901, describes a controller for a rotary converter. The controller starts and regulates the running of a rotary converter.

U.S. Pat. No. 732,906 to Steinmetz, issued in July of 1903, describes improvements to a dynamo-electric machine, particularly a rotary converter. A number of leads are connected to the armature winding of a converter which in normal operation carry currents of substantially the same phase.

U.S. Pat. No. 1,244,569 to Woodbridge, issued in October of 1917, describes a means for interconverting alternating and direct current. A magnetic structure is rotated by a motor causing direct current to pass through a circuit to produce magnetic flux. Reversal of the magnetic flux induces and electromotive force in coils which apears as alternating current electromotive force at collector rings. Alternating current is taken from the collector rings.

U.S. Pat. No. 1,284,370 to LaCour, issued in November of 1918, describes a dynamo-electric machine adapted to serve as a motor-generator or as a generator of alternating and direct currents. The rotor winding serves as an armature winding for the direct current and at the same time as a short-circuited secondary winding for the alternating current.

U.S. Pat. No. 2,462,624 to Fletcher, issued in February of 1949, describes a voltage regulating system which includes a rotary converter.

U.S. Pat. No. 3,665,502 to Mean, issued in May of 1972, describes an electrical motor-generator converter drawing energy from a low voltage battery to operate portable electric tools or the like rated for commercially standard utility voltages.

Kato Engineering Company (of North Mankato, Minn.), a corporate division of Reliance Electric Company (of Cleveland, Ohio), manufactures and sells rotary converters of various sizes for producing alternating current from direct current and distributes, for example, a catalog sheet RC-182 describing rotary converters.

SUMMARY OF THE INVENTION

The present invention includes a rotary converter for converting direct current to alternating current. The rotary converter includes a rotor and a stator. The rotor includes a first set of windings for carrying direct current and a second set of windings for carrying alternating current. The present converter may be operated from a standard twelve volt automobile battery, for example, to supply alternating current to a tool or electric device requiring such current. The present rotary converter provides superior operation over prior art rotary converters.

The present invention includes a rotor for use in dynamo for converting direct current to alternating current. The rotor includes a shaft, a commutator concentric with the shaft, and an armature core on the shaft adjacent the commutator and having slots in its outer circumference parallel to the axis of the shaft. At least one slip ring is mounted to the shaft adjacent the armature core. A first or direct current set of windings is electrically connected to the commutator and wound in a wave pattern through the armature core slots. A second or alternating current set of windings is electrically connected across the slip ring and another point on the shaft and is wound in a series of alternating clockwise and counterclockwise loops through the armature core slots.

BRIEF DESCRIPTION OF THE DRAWINGS

FIG. 4 is an enlarged perspective view of the rotor of FIG. 1 illustrating the direct current and the alternating current windings therein;

FIG. 5 is a fragmentary, greatly enlarged view generating from the rotor of FIG. 4 and illustrating the connection of the direct current windings to the commutator and the pattern of the alternating current winding in the armature core slots.

DETAILED DESCRIPTION OF THE PREFERRED EMBODIMENTS

Figure 1:
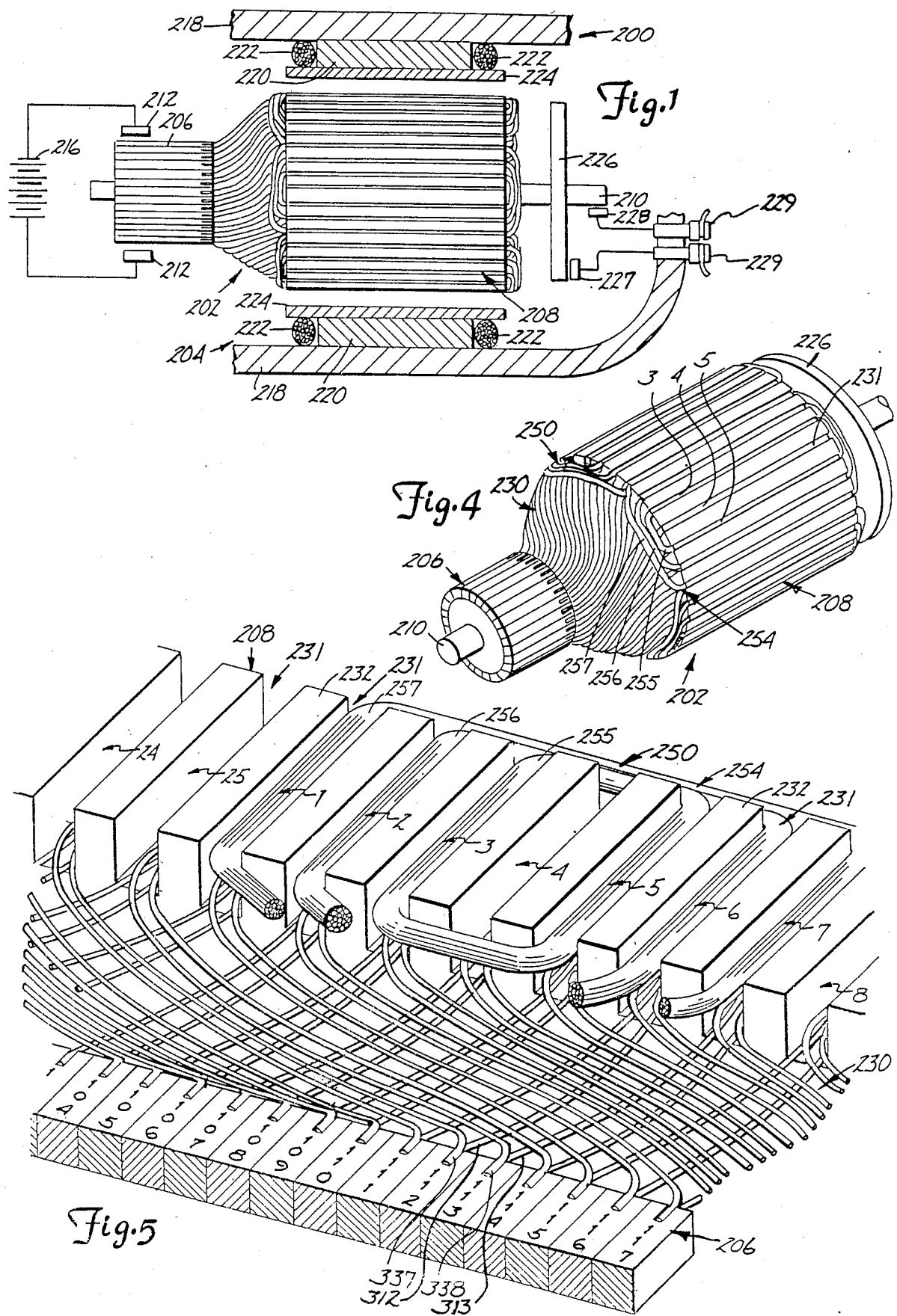
FIG. 1 is a side elevational schematic, transverse sectional view of a rotary converter of one form of the present invention with a rotor shown in full and with certain other portions shown in section for clarity of illustration.

A rotary converter of the present invention is indicated generally at 200 in FIG. 1. The converter 200 includes a rotor or armature 202 and a stator 204. The stator 204 includes a yoke or frame 218. The rotor 202 includes a central, rotating shaft 210, a commutator 206 concentric with the shaft 210 and an armature core 208 concentric with the shaft 210 adjacent the commutator 206. The rotor 202 and its elements may be constructed in any usual or preferred manner. Four brushes 212 are slidably mounted with respect to frame 218 in known manner and are equally spaced around the commutator 206 and connected to a direct current supply 216 (such as a battery). The brushes 212 slide on the commutator 206 in known manner.

A slip ring or collector ring 226 is mounted on the shaft 210 adjacent the armature core 208. A first alternating current brush 227 is slidably mounted on the slip ring 226 in known manner. A second alternating current brush 228 is slidably mounted on the shaft 210 in known manner. The brushes 227 and 228 are electrically connected to alternating current terminals 229,229 mounted on the frame 218 in known manner.

Mounted along an inner surface of the stator yoke or frame 218 is a known four-pole circuit. Four pole cores 220 are spaced approximately 90° apart from one another in known manner. Each pole core 220 includes a field winding 222 and a pole shoe 224 in known manner.

Figure 2:
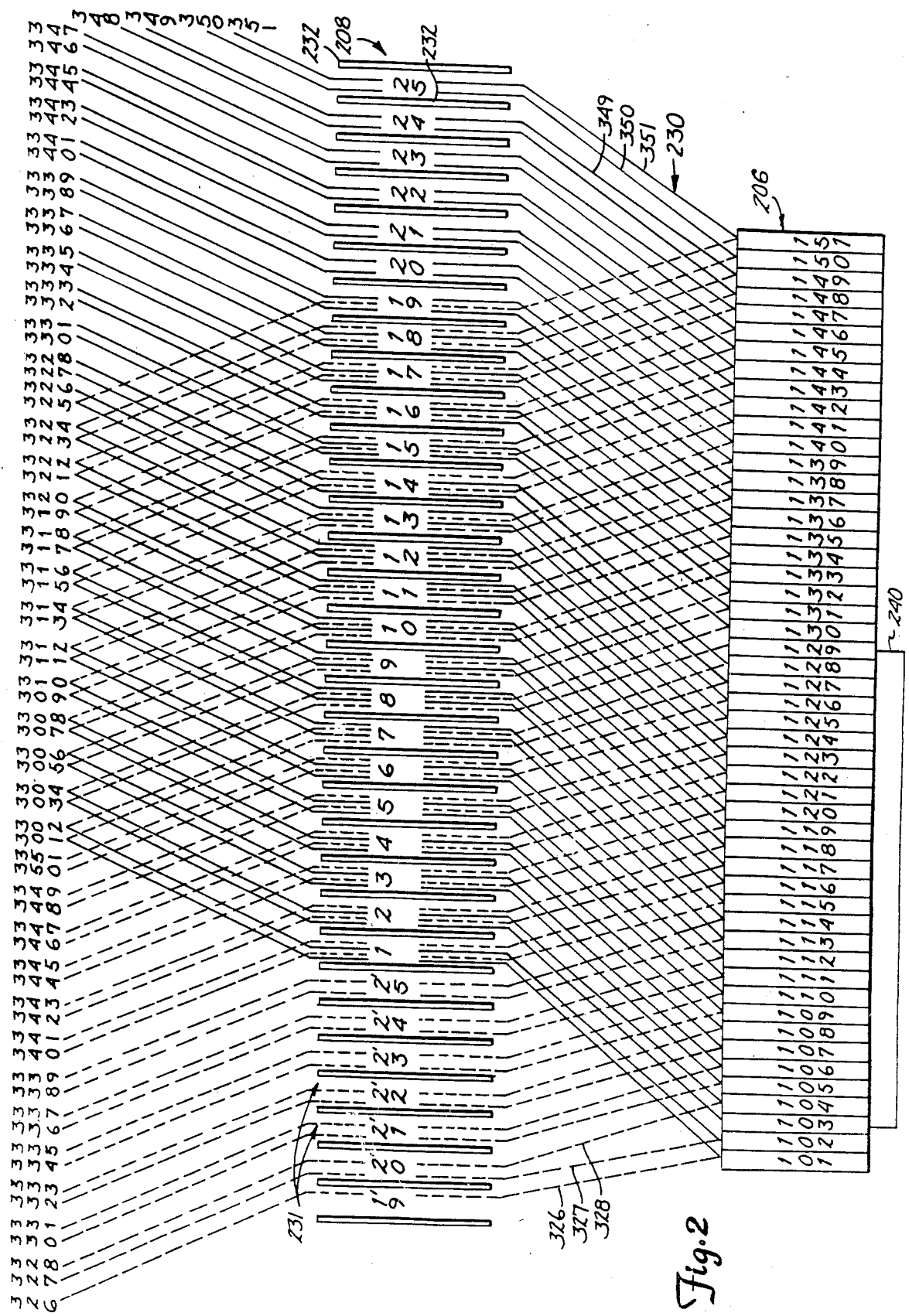
FIG. 2 is a wiring diagram illustrating the direct current winding pattern for the rotor of FIG. 1.

FIG. 2 illustrates the wiring pattern of a first or direct current winding 230 of the present converter 200. In the embodiment illustrating in the figures, twenty-five armature core slots, collectively indicated at 231, are provided in the outer circumference of the armature core 208 in known manner. The slots 231, individually numbered 1-25, are parallel to the axis of the shaft 210. Risers 232, seen best in FIG. 5, are provided between each adjacent pair of the armature slots 231 in known manner.

In the embodiment of the figures, the commutator 206 is constructed of fifty-one segments or bars, individually numbered 101-151. The bars 101-151 are constructed from copper or other suitable material and are individually insulated from each other and from the shaft 210 in known manner. If FIG. 2 were rolled up so as to form a cylinder, armature slots 19, 20, 21, 22, 23, 24 and 25 would overlap, that is be coincident with, armature slots 19', 20', 21', 22', 23', 24' and 25'.

Direct current winding 230 consists of a plurality of wires, each represented as a straight line in FIG. 2. For purposes of clarity, the dotted lines represent the undersides of the wiring and the full lines represent the top sides of the wiring. In the embodiment of the figures, the direct current winding 230 consists of fifty individually insulated wires, individually numbered 301-351, omitting the number 329. To simplify the figures, each wire is numbered according to the commutator bar from which it originates. For example, wire 301 originates from bar 101. Wire 351 originates from bar 151.

It is preferred that a wave-type winding be employed in the armature 202 of the present rotary converter 200. Each wire is electrically connected at its ends to separate bars of the commutator 206 after being wound through appropriate armature core slots 231. For example, as seen in in FIG. 2, wire 302 is electrically connected at a first end to commutator bar 102, routed through armature core slot 1, wrapped around the armature core 208, routed through armature core slot 7 and electrically connected at a second end to bar 128. Each subsequent bar 103-151, except for bar 129, has a wire electrically connected to or originating from it and wound through the slots 231 of armature core 208. This wave winding pattern is followed for all bars 101-151 on the commutator 206 except for bars 103 and 129.

In each armature slot 1-25, four wires are routed—two wires exiting or originating from the commutator 206 and two wires returning to the commutator 206. Once routed through an armature slot 1-25, a wire is wrapped around the armature core 208 and routed through the sixth-subsequent slot. For example, wires 301 and 302 are routed through slot 1 and routed through slot 7. Wires 340 and 341 are routed through slots 20 and routed through slot 1.

Each wire, except wire 328, is electrically connected at its second end to the twenty-sixth subsequent commutator bar relative to the bar to which the first end is electrically connected. For example, a wire 301 is electrically connected at a first end to commutator bar 101, routed through armature core slot 1, wrapped around the armature core 208, routed through armature core slot 7 and electrically connected at a second end to commutator bar 127. For example, wire 330 is electrically connected at its first end to bar 130 and electrically connected at its second end to bar 105.

Figure 3:
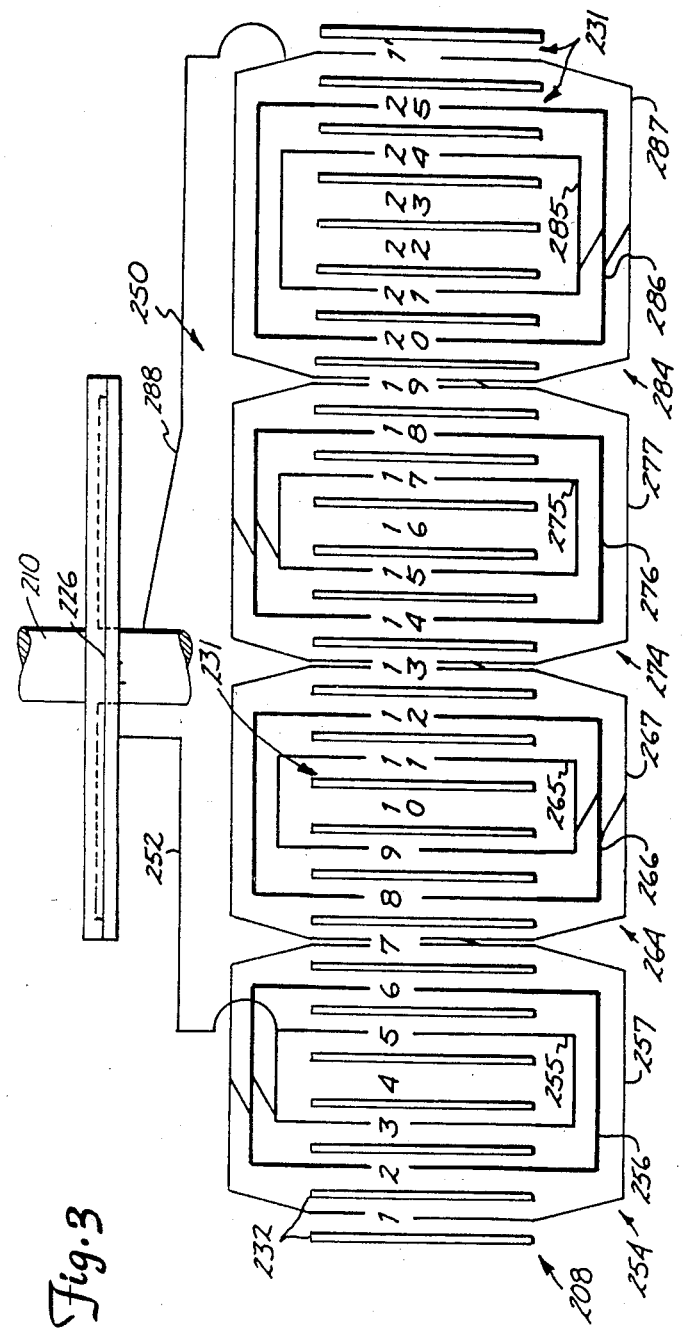
FIG. 3 is a wiring diagram illustrating the alternating current winding pattern for the rotor of FIG. 1.

Each bar of the commutator 206, except bars 103 and 129, has two wires electrically connected to it in the manner described above. For example, as shown in FIGS. 3 and 5, wires 312 and 337 are electrically connected to bar 112. Wires 313 and 338 are electrically connected to bar 113.

Wire 328 is electrically connected at its first end to bar 128 and electrically connected at its second end to bar 104, the twenty-seventh subsequent bar, rather than the twenty-sixth subsequent bar.

Wire 303 is electrically connected at its first end bar 103 and at its second end to bar 129. No wire through the armature core slots originates, or is electrically connected at its first end to bar 129. No wire through the armature core slots is electrically connected at its second end to bar 103. Thus, bars 103 and 129 have only one wire through the core slots electrically connected to each of them, rather than two such wires as in all other bars of the commutator 206.

To complete the armature winding 230, a wire or jumper 240 is provided between commutator bars 103 and 129. For purposes of clarity of illustration in FIG. 2, the jumper 240 is depicted on the opposite side of the commutator 206 from the direct current winding 230. In actual construction, the jumper 240 is routed between the commutator 206 and the armature core 208.

FIG. 3 shows a second or alternating current winding 250 of the converter 200 of the present invention. The winding 250 is also routed through selected armature slots 231. The alternating current winding 250 is wound after the direct current winding 230 is on the armature core 208. In other words, once the direct current winding 230 is wound on the armature core 208, the alternating current winding 250 is wound through the armature slots 231. Thus, the alternating current winding 250 is wound on top of the direct current winding 230.

The alternating current winding 250 is wound into four alternating clockwise/counterclockwise loops through the armature slots 231. Each loop consists of three electrically interconnected coils: an inner coil, a middle coil and an outer coil.

A first end 252 of the alternating current winding 250 is electrically connected to the slip ring or collector ring 226 and wound in a first clockwise loop 254. As illustrated best in the generated view of FIG. 5, loop 254 includes an inner coil 255 wound through slots 3 and 5, a middle coil 256 wound through slots 2 and 6, and an outer coil 257 wound through slots 1 and 7. For purposes of clarity of illustration, other portions of the alternate current winding 250 have been omitted. Winding 250 is not wound through slot 4.

Next, as shown in FIG. 3, the alternating current winding 250 is wound in a first counterclockwise loop 264. Loop 264 includes an inner coil 265 wound through slots 9 and 11, a middle coil 266 wound through slots 8 and 12 and an outer coil 267 wound through slots 7 and 13. Winding 250 is not would through slot 10.

Next, the alternating current winding 250 is wound in a second clockwise loop 274. Loop 274 includes an inner coil 275 wound through slots 15 and 17, a middle coil 276 wound through slots 14 and 18 and an outer coil 277 wound through slots 13 and 19. Winding 250 is not wound through slot 16.

Next, the alternating current winding 250 is wound in a second counterclockwise loop 284. Loop 284 includes an inner coil 285 wound through slots 21 and 24, a middle coil 286 wound through slots 20 and 25 and an outer coil 287 wound through slots 19 and 1. Winding 250 is not wound through slots 22 and 23.

A second end 288 of the alternating current winding 250 is electrically connected to the shaft 210.

In operation, power from the battery 216 is supplied to the field winding 222 and to the brushes 212. The current excites the magnetic field causing the rotor 202 to rotate in known manner. Alternating current is taken from the slip ring 226 and shaft 210 through brushes 227 and 228, respectively, in known manner for single phase alternating current to power a remote device requiring alternating current. It is to be understood that additional slip rings may be mounted on the shaft 210 to produce multi-phase alternating current.

The rotary converter 200 of the present invention is particularly adaptable for operation from an automobile battery (12 volts direct current, for example). When operating, the converter 200 can supply alternating current, e.g. 120 volts, to electrical appliances requiring such alternating current.

In a successfully-operated prototype of the present invention, No. 14 gauge wire was utilized for the wires 301–351 of the direct current winding 230. No. 17 gauge wire was utilized for the alternating current winding 250. In this prototype, nineteen turns were utilized for each of the inner coils 255, 265, 275, and 285. Twenty-three turns were utilized for each of the middle coils 256, 266, 276 and 286. Eleven turns were utilized for each of the outer coils 257, 267, 277 and 287. It is to be understood that wires of other sizes and coils with other numbers of turns come within the scope of the present invention.

Although the present invention has been described with reference to preferred embodiments, workers skilled in the art will recognize that changes may be made in form and detail without departing from the spirit and scope of the invention.

What is claimed is:

1. A method of wiring a rotor for a rotary converter, the rotor of the type having a central shaft, a commutator concentric with the shaft, an armature core concentric with the shaft and adjacent the commutator, the core having slots in its outer circumference parallel to the axis of the shaft, and concentric slip ring means including at least one slip ring mounted on the armature shaft, wherein the armature core has twenty-five slots, and the commutator consists of fifty-one bars individually insulated from each other, the method comprising the steps of:

(a) routing a first winding in a wave pattern through the armature slots, this winding comprising:
  (i) a first wire electrically connected at its first end to a first commutator bar, wound through a first slot and a sixth subsequent slot of the armature core, and electrically connected at its second end to a twenty-sixth subsequent commutator bar relative to the first commutator bar,
  (ii) a second wire electrically connected at its first end to a second subsequent commutator bar, wound through the first slot and the sixth subsequent slot of the armature core, and electrically connected at its second end to the twenty-sixth subsequent bar relative to the second commutator bar, wherein each wire of each subsequent pair of wires is electrically connected at its first end to one of a pair of next adjacent subsequent commutator bars, each pair of wires being wound through its first available subsequent armature slot relative to the first slot of the preceding pair of wires and wound through its sixth subsequent armature slot relative to its own first slot, each wire of such subsequent pair being electrically connected at its second end to a twenty-sixth subsequent commutator bar relative to the bar to which its first end is connected; except that a wire is not electrically connected at its first end to a twenty-ninth commutator bar relative to the first commutator bar and a wire electrically connected at its first end to the twenty-eighth commutator bar is electrically connected at its second end to a twenty-seventh subsequent commutator bar;
(b) electrically connecting a jumper at its first end to a third commutator bar and at its second end to a twenty-ninth commutator bar relative to the first commutator bar;
(c) routing a second winding in a series of alternating clockwise and counterclockwise loops through the armature slots; and
(d) electrically connecting the second winding to the slip ring means.

2. The method of claim 1 wherein the second winding comprises:
(a) a first clockwise loop comprising inner, middle and outer electrically interconnected coils wound through armature slots three and five, two and six, and one and seven, respectively;
(b) a first counterclockwise loop comprising inner, middle and outer electrically interconnected coils wound through armature slots nine and eleven, eight and twelve, and seven and thirteen, respectively;
(c) a second clockwise loop comprising inner, middle and outer electrically interconnected coils wound through armature slots fifteen and seventeen, fourteen and eighteen, and thirteen and nineteen, respectively; and
(d) a second counterclockwise loop comprising inner, middle and outer electrically interconnected coils wound through armature slots twenty-one and twenty-four, twenty and twenty-five and nineteen and one, respectively.

3. The method of claim 2 wherein the wires of the first winding are #14 gauge wire and the wire of the second winding is #17 gauge wire and wherein the inner coil of each loop consists of nineteen turns, the middle coil of each loop consists of twenty-three turns and the outer coil consists of eleven turns.

* * * * *